UNITED STATES PATENT OFFICE.

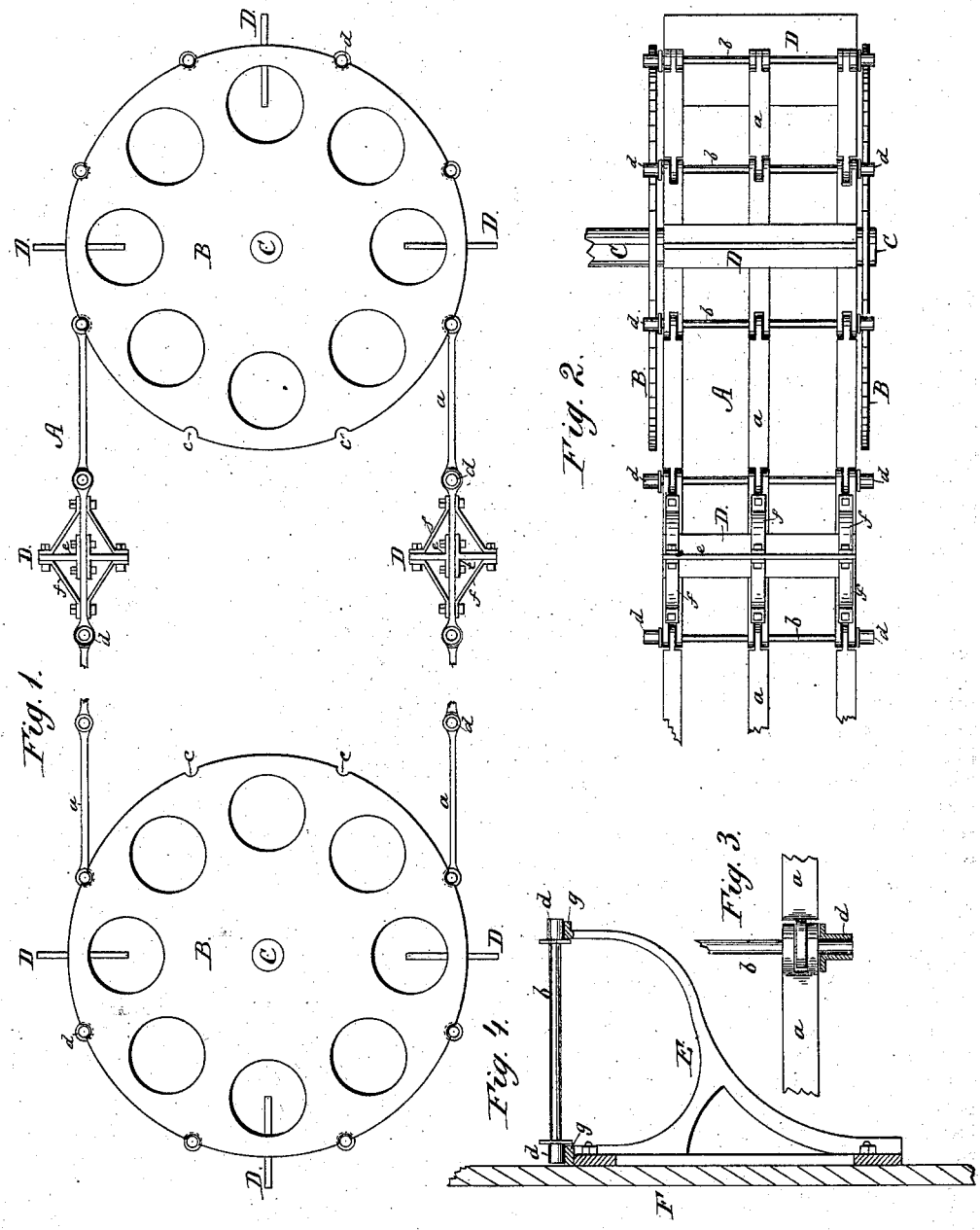

THOMAS L. LEE, OF PADUCAH, KENTUCKY.

IMPROVEMENT IN CHAIN-PROPELLERS.

Specification forming part of Letters Patent No. 216,871, dated June 24, 1879; application filed May 9, 1879.

*To all whom it may concern:*

Be it known that I, THOMAS L. LEE, of Paducah, in the county of McCracken and State of Kentucky, have invented a new and Improved Chain-Propeller; and I do hereby declare that the following is a full, clear, and exact description of the same.

My invention is an improvement in the class of paddle-propellers—that is to say, propellers in which paddles or floats are carried on endless chains which pass over wheels propelled by an engine.

The invention consists in the construction and arrangement of parts, as hereinafter described and claimed.

In the accompanying drawings, forming part of this specification, Figure 1 is a side view of my improved propeller. Fig. 2 is a plan view of a fragment or portion thereof. Fig. 3 is a detail view of a fragment of the endless chain. Fig. 4 is a vertical section, showing the bracket for supporting the upper portion of the endless chain.

The endless chains A pass around disks or wheels B, of which there are two placed parallel on each shaft C C. In practice, the latter project laterally from the side of the vessel to be propelled, and the engine is connected with the rear one, C, which is the crank-shaft.

The endless chains A are formed of bars or links *a*, arranged parallel in successive sets or series of two or more, and cross-rods *b*, which pass through eyes formed on the ends of the bars, thus connecting the several sets or series. The ends of the rods *b* project beyond the outer links, *a*, far enough to enter open half-round notches *c* in the disks B, said notches being necessarily the same distance apart, in a right line, as the rods are.

As the disks B, revolve the rods *b* successively enter and leave the notches *c*, thus causing the chains and paddles to travel, and effecting the propulsion of the vessel. Flanged sleeves or collars *d* are attached to the ends of the rods for taking the wear incident to such operation, and also for holding the rods in place or preventing their endwise movement when passing between the disks. Said flanged sleeves may be hardened or constructed of steel to increase their wearing quality. They are so attached to the rods as to adapt them to be easily removed and replaced by others when worn.

The paddles D are formed of metal plates having right-angular base-flanges *e*. The said flanges rest on the middle of the bars *a*, and are bolted or otherwise rigidly secured to the same. The paddles are braced on each side by inclined rods *f*, which are bolted to them and to the bars *a*, as shown. Thus constructed and attached to the bars, the paddles are capable of resisting great strain and sustaining violent blows by contact with objects floating in the water. The length of the paddles is such that they pass between the disks of each pair, and are in a measure protected by the disks from injury.

In order to prevent sagging of the upper portion of the endless chain A, between the disks B B I may employ a bracket, E, Fig. 4, which is attached to the side F of the vessel, and has horizontal parallel rails *g*, on which the flanged collars *d* slide as the chain travels around the disks B.

What I claim is—

The combination, with the endless chain, of the paddles, each of which is formed of two right-angular plates placed together and secured by bolts passing through their horizontal or base flanges, all as shown and described.

THOMAS L. LEE.

Witnesses:
 DORSEY DUNN,
 JOSHUA C. COBB.